United States Patent [19]

Descombes

[11] Patent Number: 4,986,605
[45] Date of Patent: Jan. 22, 1991

[54] ASSEMBLY OF A VEHICLE NON-DRIVING WHEEL HUB EQUIPPED WITH A PULSER AND SENSOR DEVICE FOR MEASURING THE SPEED OF ROTATION OF THE WHEEL

[75] Inventor: Michel Descombes, Versailles, France

[73] Assignee: SKF France, Clamart, France

[21] Appl. No.: 351,500

[22] Filed: May 15, 1989

[30] Foreign Application Priority Data

May 19, 1988 [FR] France ................. 88 06720

[51] Int. Cl.⁵ ............................. B60B 27/00
[52] U.S. Cl. ............................ 301/105 R; 324/173
[58] Field of Search ........... 301/105 R, 108 R, 124 R, 301/125, 6 WB; 73/494; 324/173

[56] References Cited

U.S. PATENT DOCUMENTS

| 3,928,780 | 12/1975 | Fiat ............................ 310/168 |
| 4,013,954 | 3/1977 | Deem et al. .................. 324/173 |
| 4,510,408 | 4/1985 | Jovick et al. ................. 324/173 X |
| 4,797,612 | 1/1989 | Nakanishi et al. ............ 324/173 |
| 4,864,231 | 9/1989 | Okumura et al. ............. 324/173 |

FOREIGN PATENT DOCUMENTS 0020204 4/1980 European Pat. Off. .
0136493 8/1984 European Pat. Off. .
2424136 11/1979 France .

Primary Examiner—Russell D. Stormer
Attorney, Agent, or Firm—Beveridge, DeGrandi & Weilacher

[57] ABSTRACT

Assembly of a vehicle non-driving wheel hub equipped with a pulser and sensor unit for sensing the speed of the wheel and comprising an integral roller bearing (1, 2, 3) with two rows of rolling elements located between two internal roller bearing rings (2, 3) and an external ring (1) constituting the hub for securing the wheel, characterized by the fact that the stub axle (4) comprises at one of its end located towards the wheel (5) a shoulder flange (6) bearing on one (2) of the rings, and at its other end a threaded portion (8) making it possible, with the help of a stop nut (9), simultaneously to tighten the two internal rings (2, 3) against the stub axle carrier (7) and mount the stub axle (4) in the said stub axle carrier after the stub axle has been introduced into the stub axle carrier.

17 Claims, 4 Drawing Sheets

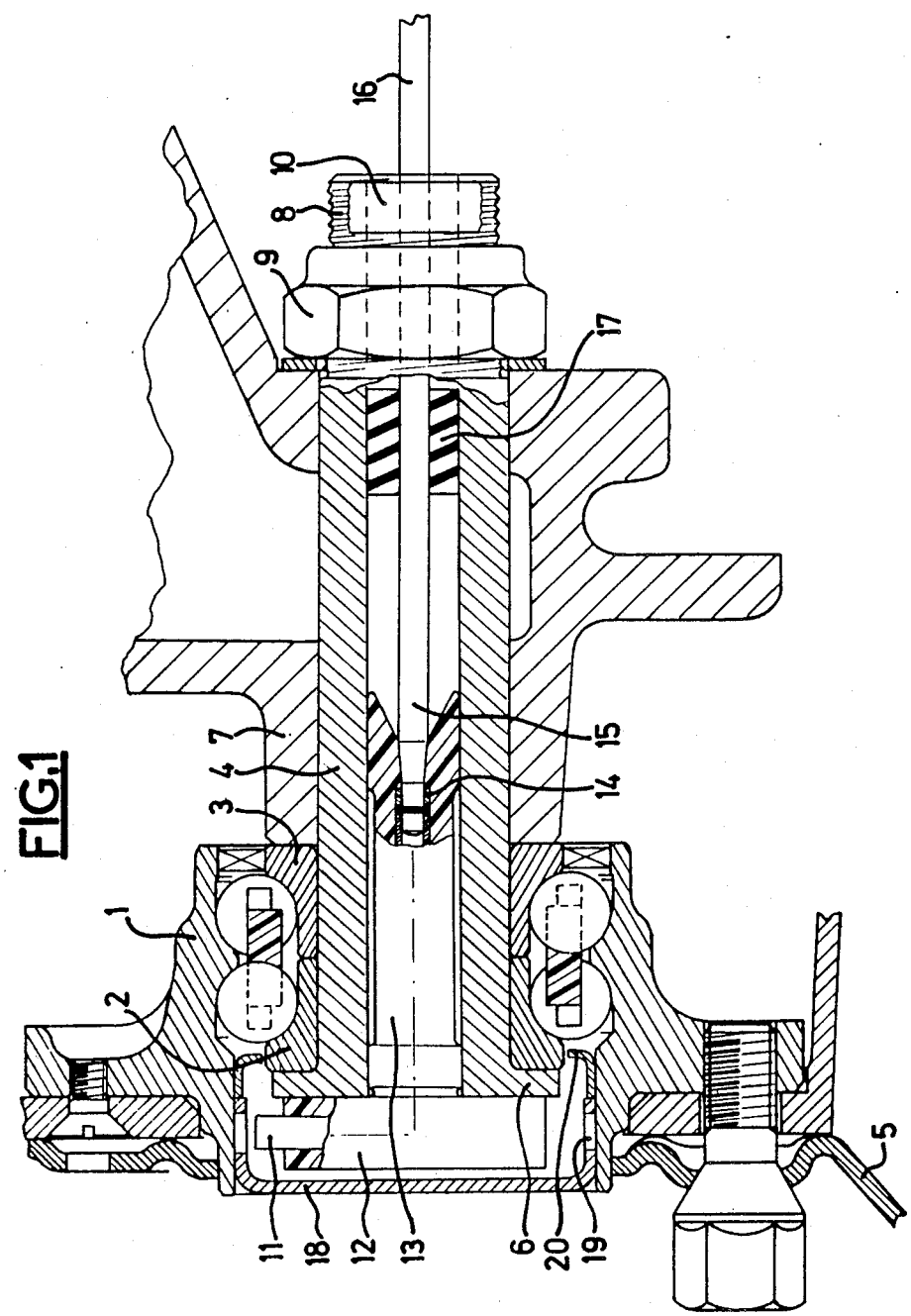

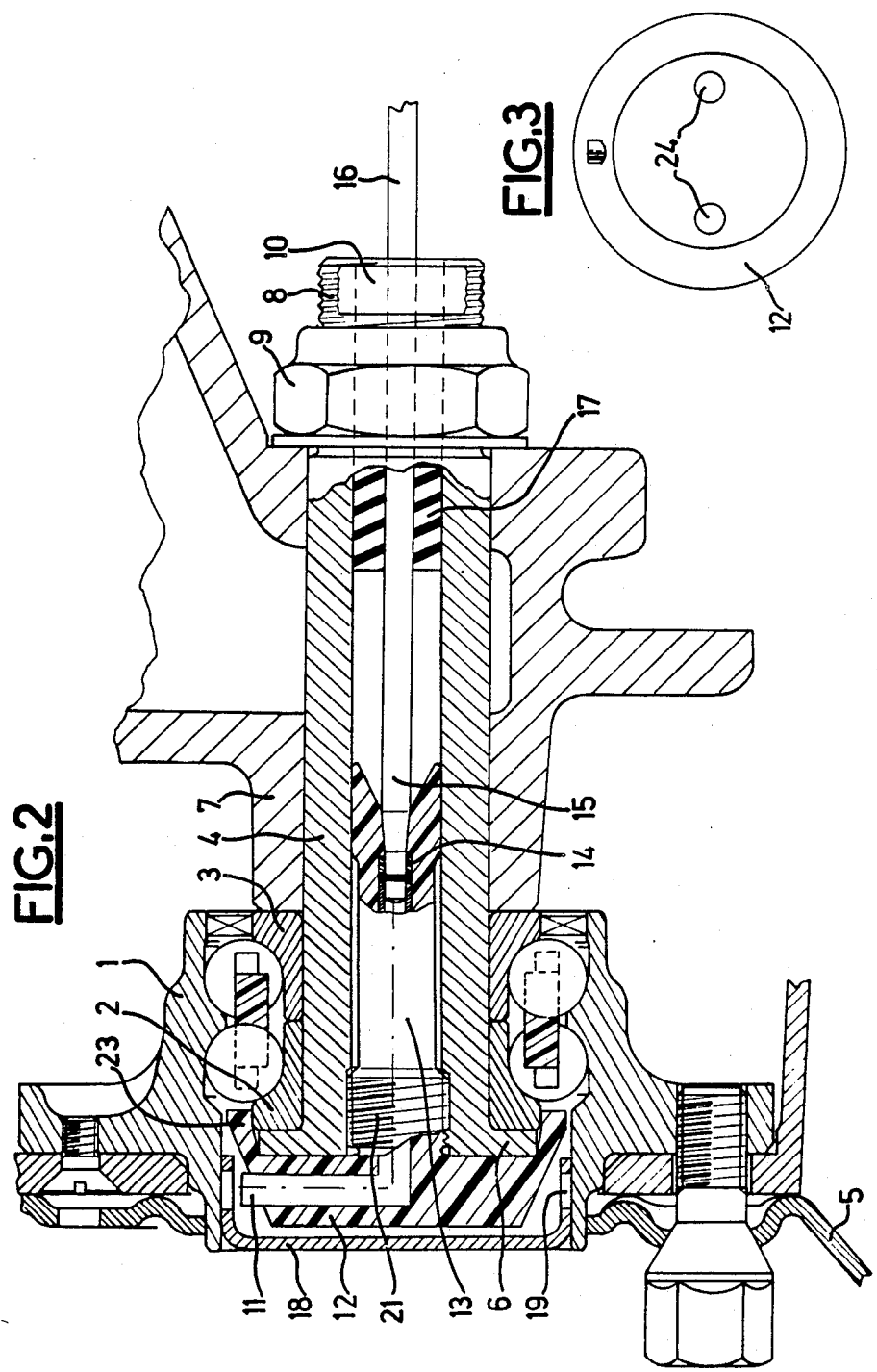

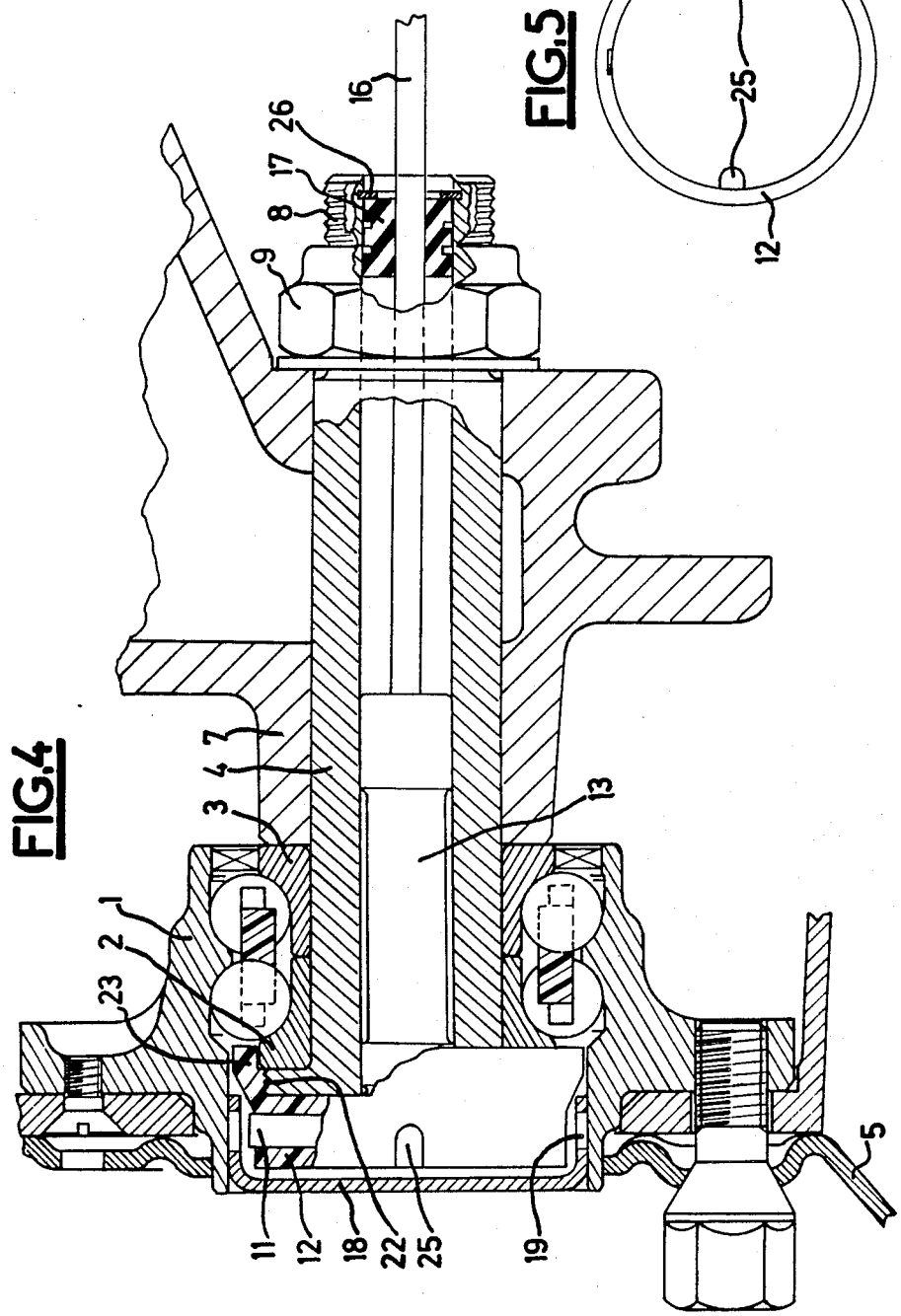

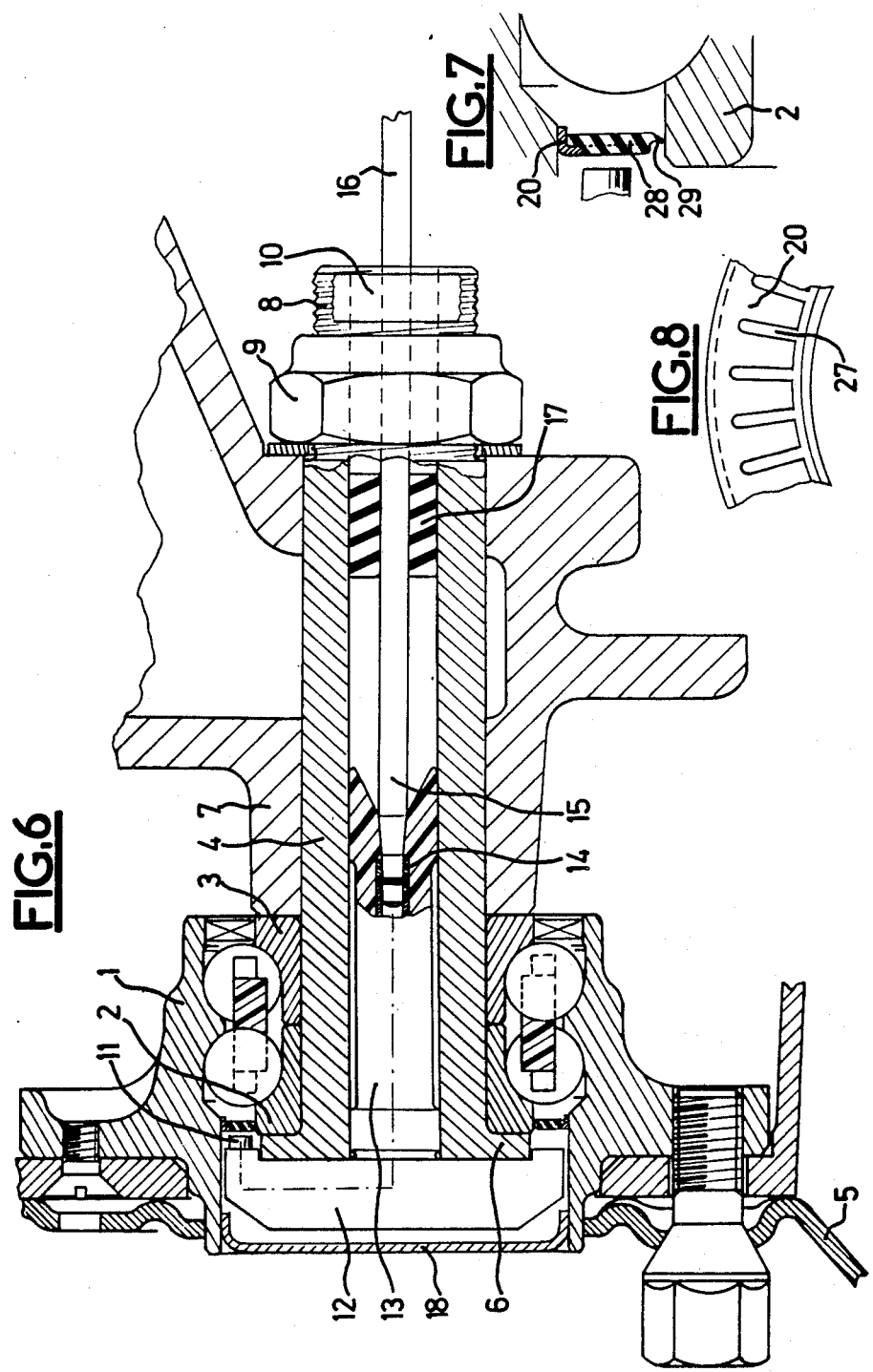

ASSEMBLY OF A VEHICLE NON-DRIVING WHEEL HUB EQUIPPED WITH A PULSER AND SENSOR DEVICE FOR MEASURING THE SPEED OF ROTATION OF THE WHEEL

FIELD OF THE INVENTION

The invention relates to the assembly of a vehicle non-driving wheel hub equipped with a pulser and sensor device for measuring the speed of rotation of the wheel.

PRIOR ART

Such an assembly is already described in French patent application No. 87.15794 in the name of the applicant. In this prior device, the integral rolling bearing is axially immobilized on the stub axle by axial tightening of the internal rings of the bearing between a shoulder of the stub axle and a stop nut located on the wheel side of the vehicle, inside the rolling bearing. This arrangement of the stop nut has several drawbacks, in particular that of taking up considerable room inside the space available in the rolling bearing, which entails the use of miniaturized sensors to measure the speed of the wheel. Furthermore, the sensor and its connection, as well as the closing cap, necessarily have to be put into place after this stop nut has been tightened, after the hub has been mounted on the vehicle.

SUMMARY OF THE INVENTION

The object of the invention is to remove the above drawbacks, in particular to leave more room free in the hub for the sensor, and to enable this sensor and the closing cap to be mounted prior to the installation of the whole on the vehicle.

For this purpose, the invention consists, while continuing to make use of an integral rolling bearing of the type aforementioned, in mounting it with the help of a stub axle comprising at its end located on the wheel side a shoulder flange that is housed inside the hub and, at its other end, a threaded portion enabling the stub axle to be tightened on the stub axle carrier, after introducing this stub axle ready equipped with its rolling bearing through the said stub axle carrier.

Thanks to this arrangement and to the greater amount of room available inside the hub, the sensor does not need to be miniaturized and it can be mounted in advance with its connection end piece in the axis of the stub axle.

The closing cap can also be mounted in advance in the workshop and it can advantageously be integrated with the pulser.

THE DRAWINGS

Other features of the invention will become apparent form the following description of various forms of embodiment taken as examples and shown on the attached drawings, wherein:

FIG. 1 is an axial cross-sectional of a first form of embodiment;

FIG. 2 is a corresponding axial cross-section of a second form of embodiment;

FIG. 3 is an end view of the corresponding sensor;

FIG. 4 is an axial cross-section of a third form of embodiment;

FIG. 5 is an end view of the corresponding sensor;

FIG. 6 is an axial cross-sectional of a final form of embodiment;

FIG. 7 is a larger scale detail of a fragment of FIG. 6; and

FIG. 8 is an enlarged front view of a fragment of the corresponding pulser of FIG. 7.

DETAILED DESCRIPTION OF THE INVENTION

As can be seen from FIG. 1, the integral rolling bearing, which is of the same type as in the aforementioned patent application and which includes, in particular, an outer hub-forming ring 1 and two internal rings 2 and 3. The essential difference is that, according to the invention, the stub axle 4 comprises on its end towards the wheel 5 a shoulder flange 6, of small size, which presses the assembly of internal rings 2 and 3 against the stub axle carrier 7. For this purpose, the other end of the stub axle 4 comprises a threaded portion 8 onto which can be screwed a stop nut 9. To enable the stub axle 4 to be rotationally immobilized while this nut 9 is being tightened, use can be made, for example, of flats 10.

The first consequence is that it is possible to have far more room inside hub 1 to house the sensor 11 which, as a result, does not need to be miniaturized but can, on the contrary, be constituted by a conventional larger sensor which, in the current state of the art, is far less expensive, less fragile and easier to put into place than miniaturized sensors.

In particular, this sensor 11 can advantageously be integrated in a sensor holding plug 12 of plastic material extending in the axis of the stub axle by a shank 13 in the end of which is integrated a female socket 14 for a connecting plug 15, improving and facilitating the electrical connection of the sensor 11 once the whole is mounted on the vehicle, with the help of a connecting cable 16 terminated by the plug 15. An elastomer plug 17, moulded or bonded onto the wire 16 is used to ensure tightness and to improve fixation.

Also thanks to this arrangement, the unit comprising the stub axle, the sensor 11 and the sensor holding plug 12 with its connection 14, and also the closing cap 18 of the hub, can be integrated in advance in the unit comprising the assembly to be installed on the vehicle, which facilitates both manufacture and final installation.

The pulser 19 can advantageously be machined in the protective cap 18, if the latter is of ferromagnetic material, simply by cutting out therein in its cylindrical portion a series of rectangular orifices, as in the examples in FIGS. 1, 2, and 4.

A closing part 20 can further be fitted into the hub 1 to leave only a narrow gap between its radial portion and the periphery of the internal rolling bearing rings 2, in order to ensure better retention of the grease of the rolling bearing.

In the example shown in FIG. 1, the sensor holder 12, made as we have seen from moulded plastic material, as well as its shank 13, is fixed by simply fitting into the internal bore of stub axle 4.

In the variant shown in FIGS. 2 and 4, this fixing is effected by screwing respectively one threaded portion 21 screwing inside the bore of stub axle 4, in the example shown in FIG. 2, or a threaded portion 22 screwing on the outside of the shoulder flange 6 in the example given in FIG. 4.

Furthermore, in these two examples, the sensor holder 12 can advantageously comprise an enclosing periphery 23 performing the same function as the retaining part 20 in FIG. 1, except that the narrow gap ensuring the retention of the grease is on the outside as this part is non-rotating.

To screw the sensor holder 12 in these last two examples, use can be made, for example, of a spanner with pins penetrating orifices 24 as represented in FIG. 3, or notches 25 as represented in FIGS. 4 and 5.

Furthermore, in the example given in FIG. 4, it has been shown how to improve the mechanical retention of the sealing plug 17 using a circlip 26 housed in a groove machined in the internal bore of the stub axle 4, close to the threaded end 8. This last solution prevents positively any likelihood of the wire 16 being pulled out accidentally.

Finally, in the example of embodiment in FIG. 6, the pulser is formed in the rotating closing piece 20. The sensor 11 is orientated parallel to the axis of sensor holder 12. The sensor 11 senses the slots 27 cut out in the radial portion of the metallic part 20. In this case, to ensure that this part continues to perform its closing and grease retaining function, there can advantageously be moulded thereon an elastomer part 28 which closes all the slots 27 and further constitutes an actual sealing lip 29 bearing on the internal ring 2 as shown in FIG. 7.

In all cases, the invention thus makes it possible to improve both production and assembly costs, at the same time as the reliability of unit, once mounted on the vehicle.

We claim:

1. A wheel hub assembly for a non-driving wheel of a vehicle comprising:
   a bearing assembly having a rotatable outer ring, two nonrotatable inner rings, and two rows of rolling elements located between said outer ring and said inner rings, said outer ring including means for mounting thereon a non-driving wheel of a vehicle, said outer ring having an internal recess,
   a pulser and sensor unit including a pulser and a sensor located inside the internal recess of the outer ring,
   a closing cap tightly enclosing the pulser and sensor unit within said internal recess,
   a stub axle carrier,
   a stub axle mounted on the stub axle carrier independently of said bearing assembly, said stub axle extending axially through the inner rings to support the bearing assembly, said stub axle having outboard and inboard ends, said outboard end being near the means for mounting a wheel and being provided with a shoulder flange which bears on one of the inner rings, said inboard end of the stub axle including a threaded portion.
   a stop nut threaded on said threaded portion of the stub shaft to tighten the inner rings against the stub axle carrier and to retain the stub axle on the stub axle carrier.

2. An assembly according to claim 1 having a sensor holder mounted directly on one end of the stub axle, said sensor being mounted on the sensor holder.

3. An assembly according to claim 2 is which the sensor is radially oriented with respect to the stub axle.

4. An assembly according to claim 2 in which the sensor is axially oriented with respect to the stub axle.

5. An assembly according to claim 2 in which the stub axle has an internal bore, said sensor holder having a shank which is located in said internal bore of the stub axle, said shank having an end provided with female electrical connector means for connecting to an end of a connecting cable.

6. An assembly according to claim 5 including a connecting cable provided with a plug which is in said internal bore of the stub axle.

7. An assembly according to claim 6 having axial retention means for retaining said plug in said internal bore of the stub axle.

8. An assembly according to claim 2 wherein the stub axle has an internal bore and the stub axle carrier has a shank which is inserted in said internal bore to fix the stub axle to the stub axle carrier.

9. An assembly according to claim 2 wherein the stub axle is screwed to the stub axle carrier to fix the stub axle to the stub axle carrier.

10. An assembly according to claim 1 having a grease-retaining closing piece, said closing piece filling a space between the outer ring and an inner ring except for a small gap which permits rotation of the outer ring.

11. An assembly according to claim 10 having a sensor holder formed integrally with the closing piece.

12. An assembly according to claim 1 wherein the sensor is a radially oriented sensor, said pulser being formed integrally with said closing cap.

13. An assembly according the claim 1 wherein the sensor is an axially oriented sensor, a closing piece which substantially fills a space between the outer ring and the inner ring, said pulser being of the rotary type and being formed integrally with said closing piece.

14. An assembly according to claim 13 wherein the closing piece is metallic and slots are formed therein to form the pulser, an elastomer part molded on the metallic closing piece to ensure continuity of the closing piece.

15. An assembly according to claim 14 in which the elastomer part has a sealing lip contacting an inner ring of the bearing assembly.

16. An assembly according to claim 1 wherein, to facilitate installation, means are provided for holding the stub axle against rotation when the stop nut is being tightened.

17. An assembly according to claim 16 wherein said means for holding the stub axle against rotation includes flats formed on the stub axle.

* * * * *